United States Patent

[11] 3,598,902

[72] Inventors Walter R. Davis
Tempe;
Gerald K. Lunn, Scottsdale; James E. Solomon, Phoenix, all of, Ariz.
[21] Appl. No. 832,137
[22] Filed June 11, 1969
[45] Patented Aug. 10, 1971
[73] Assignee Motorola, Inc.
Franklin Park, Ill.

[54] GATED DIFFERENTIAL GAIN CONTROL CIRCUIT FOR A TELEVISION RECEIVER
7 Claims, 3 Drawing Figs.

[52] U.S. Cl. .......... 178/7.3 DC, 330/38 M
[51] Int. Cl. .......... H04n 5/52
[50] Field of Search .......... 178/7.3 DC, 7.5 DC, 5.4 AC; 330/38 M, 20, 17, 69, 30 D

[56] References Cited
UNITED STATES PATENTS

| | | | |
|---|---|---|---|
| 2,663,806 | 12/1953 | Darlington | 330/17 |
| 3,370,245 | 2/1968 | Royce et al. | 330/69 |
| 3,450,834 | 6/1969 | De Marinis et al. | 178/7.3 DC |
| 3,456,128 | 7/1969 | Myers | 330/69 |
| 3,469,195 | 9/1969 | Harwood | 330/17 |

*Primary Examiner*—Robert L. Griffin
*Assistant Examiner*—George G. Stellar
*Attorney*—Mueller and Aichele

ABSTRACT: A monolithic integrated automatic gain control system for a TV receiver includes a differential gating stage having one reference input, a gating pulse input and a synchronizing signal pulse input. This gating stage is responsive to simultaneous application of gating and sync pulses to provide an output signal proportional to the signal level of the video sync pulse. This output signal is supplied to a differential IF-AGC amplifier stage which supplies an amplified IF-AGC output signal to the IF amplifier of a TV receiver to control the gain thereof. A differential RF-AGC amplifier and delay stage is coupled to the IF-AGC amplifier stage output and provides a delayed RF-AGC signal which is supplied to the RF-amplifier of the TV receiver to provide a delayed RF gain control signal thereto.

INVENTOR.
Walter R. Davis
Gerald K. Lunn
BY James E. Solomon
Mueller, Aichele & Rauner
ATTY'S.

GATED DIFFERENTIAL GAIN CONTROL CIRCUIT FOR A TELEVISION RECEIVER

BACKGROUND OF THE INVENTION

This invention relates generally to automatic gain control (AGC) systems for television receivers and more particularly to an improved AGC integrated circuit (IC) featuring automatic gain control for both the IF and RF stages of the receiver.

Prior art AGC systems characteristically have a relatively low gain and frequently have a DC operating point which drifts with ambient temperature and variations in supply voltages. In addition to the above DC drift problem and as a result of a relatively low loop gain, most TV receivers which include the above prior art AGC systems have a 30 percent or more variation in the video output signal over the normal range of RF input signal levels. The loop gain of these prior art AGC systems is limited because they are DC coupled, and the DC drift of these prior art systems frequently exceeds their dynamic range.

In addition to the aforesaid disadvantages, these prior art AGC systems frequently include a potentiometer which is necessary for establishing the DC operating point for automatic gain control. Such potentiometer is required because of the low gain of the system and because of the fact that the system quiescent point is dependent upon variations in ambient temperature and power supply levels.

OBJECTS AND FEATURES OF THE INVENTION

An object of the present invention is to provide a new and improved automatic gain control system of the type described having a stable and well-defined DC quiescent operating point and which does not require the use of a potentiometer for establishing this operating point.

Another object of the present invention is to provide an AGC system of the type described which has a relatively high AGC loop gain.

Another object of this invention is to provide an AGC system for television receivers which maintains a substantially constant amplitude video signal at the output of the video detector of the receiver for large changes in the RF input signal level.

Another object of the present invention is to provide a new and improved automatic gain control circuit which may be fabricated in monolithic integrated circuit form.

Another object of this invention is to provide a new and improved automatic gain control circuit which is operative without detuning the IF pass band of, or introducing signal distortion into, a television receiver with which it operates.

Another object of the present invention is to provide a new and improved automatic gain control circuit having a relatively large gain control range and which produces negligible change in either the center frequency or the bandwidth of the video signal over the full AGC range.

The present invention features an automatic gain control circuit for a TV receiver and includes an input gating stage responsive to gating and video sync pulses to provide an AGC output signal proportional to the input signal level of the video sync pulses.

Another feature of the present invention is the provision of an IF-AGC amplifier stage connected to the input gating stage. The IF-AGC amplifier stage provides a first level of AGC output signals which are operative to control the DC level of an IF amplifier in the TV receiver.

Another feature of the present invention is the provision of an RF-AGC amplifier and delay stage which is coupled to the IF-AGC amplifier stage and is responsive to predetermined variations in the level of the video input sync pulses applied to the gating stage. The RF-AGC amplifier and delay stage provides a 'delayed' RF-AGC voltage which is adapted to be coupled to an RF amplifier in the TV receiver to provide additional, delayed gain control for the receiver.

Another feature of the present invention is the provision of a reference transistor, a gating transistor, and an input transistor in the input gating stage. These transistors are differentially coupled to each other and are connected to a constant current source. The simultaneous application of a gating pulse to the gating transistor and a video sync pulse to the input transistor, respectively, enables the input transistor to be differentially switched against the reference transistor. In this manner, the output voltage of the gating and reference transistors is caused to vary in proportion to the change in the DC level of the video sync pulse applied to the input transistor. This output voltage variation is further amplified in a first, IF-AGC amplifier stage and a second, RF-AGC amplifier and delay stage; and the outputs of these amplifier stages are applied, respectively, to RF and IF amplifiers in a TV receiver to control the gains of these amplifiers.

Another feature of this invention is the provision of emitter follower buffer transistors and a lateral PNP transistor in the output of the RF-AGC amplifier and delay stage. These transistors combine to provide desired levels of current and voltage in the output of the RF-AGC amplifier and delay stage.

These and other objects and features of this invention will become more fully apparent in the following description of the accompanying drawings.

THE INVENTION

Briefly described, the automatic gain control circuit of the present invention includes a gating stage which is responsive to gating and video sync input pulses to provide an output signal which is proportional to the signal level of the video sync pulses. The output signal of the gating stage is coupled to the input of an IF-AGC amplifier stage which provides a first gain control signal which is operative to control the gain of an IF amplifier in a TV system. The output of the IF-AGC amplifier stage is further coupled to the input of an RF-AGC amplifier and delay stage which is responsive to additional increases or decreases in the output signal level of the gating stage. The latter stage provides a 'delayed' automatic gain control signal which is applied to an RF amplifier in the TV system, the RF amplifier being connected to receive the incoming television signal.

Figure 1:
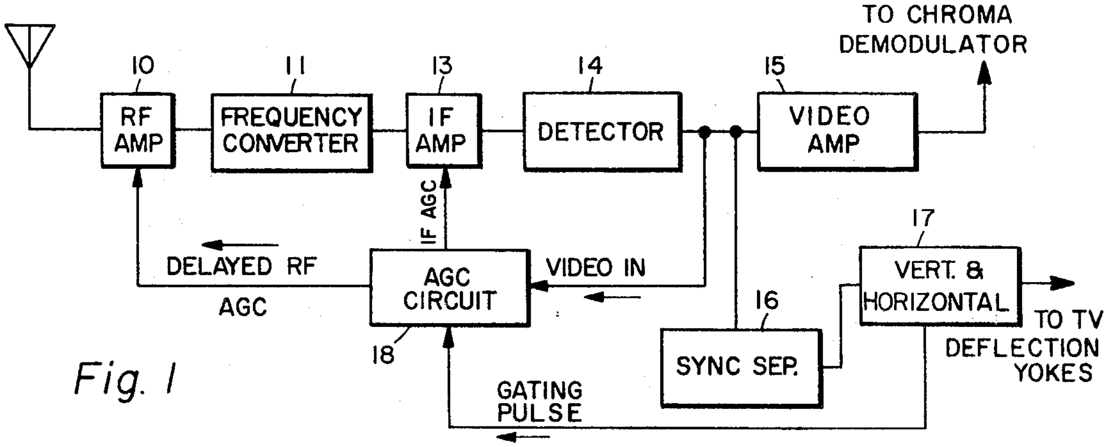
FIG. 1 is a block diagram illustration of a television system in which the present invention is used.

Referring to the drawing in more detail, there is shown in FIG. 1 a television receiver which includes an RF amplifier 10 for receiving the incoming TV signal and a frequency converter 11 which converts the RF frequency to an IF frequency signal. The converter 11 may, for example, be a mixer which is driven by a local oscillator. The IF amplifier 13 amplifies the intermediate frequency signal received from the converter 11, and a video detector 14 receives the IF signal and provides a detected video output signal which is amplified by video amplifier 15. The detected video output signal from the video amplifier 15 is applied to a chroma demodulator (not shown) in another stage of the TV system.

The video output signal from the detector 14 is applied to one input of the AGC circuit 18 and also to a sync separator 16 which provides an output pulse which locks the frequency of the horizontal time base of the system. The output of the sync separator 16 is fed to the vertical and horizontal deflection circuitry 17 of the system, and the horizontal deflection pulses of circuitry 17 are applied as one input to the AGC circuit 18. Thus, the AGC circuit 18 is responsive to both horizontal deflection pulses from the vertical and horizontal deflection circuitry 17 and video sync pulses from the output of the detector 14 and provides two AGC output signals. These AGC output signals include an IF-AGC signal which is applied to the input of the IF amplifier 13 and a delayed RF-AGC signal which is applied to the input of the RF amplifier 10. The RF-AGC signal is delayed in the sense that it is applied to the RF amplifier after the IF-AGC signal is applied to the IF amplifier. However, there is no time delay associated with the RF-AGC signal.

The AGC circuit 18 operates to maintain the tip of the video sync pulse portion of the incoming video information at a predetermined DC level. The video sync pulse input from the video detector 14 and the horizontal deflection or gating pulse from the horizontal deflection circuitry 17 are simultaneously applied to the AGC circuit 18; and the AGC circuit 18 does not respond to the video information which appears between video sync pulses. That is, the AGC circuit 18 only responds to the video sync and the horizontal deflection or gating pulses to provide automatic gain control signals at the outputs thereof.

Figure 2:
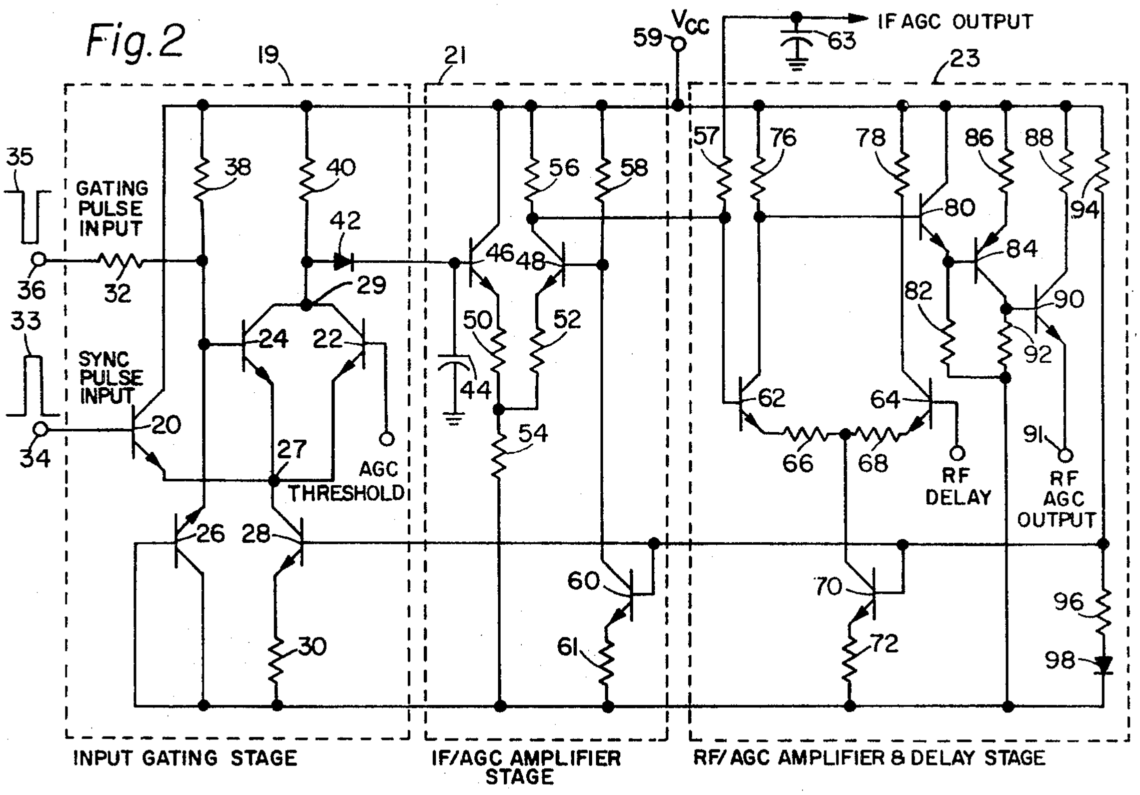
FIG. 2 is a schematic diagram of the automatic gain control circuitry according to the present invention.

The exact operation of the AGC circuit 18 according to the present invention will be better understood by referring to the schematic diagram illustrated in FIG. 2. The schematic diagram in FIG. 2 includes an input gating stage 19, an AGC amplifier stage 21, and an RF-AGC amplifier and delay stage 23. The input gating stage 19 includes a reference transistor 22 which is differentially coupled to both a gating transistor 24 and to an input transistor 20. A current source transistor 28 is connected between the common current output node 27 for transistors 20, 22 and 24 and a point of reference potential. Transistor 28 conducts a substantially constant current from one of the three transistors 20, 22 and 24 which is conducting. The common collector node 29 for the differentially coupled transistors 22 and 24 is connected through a diode 42 to the input of an AGC amplifier stage 21.

The AGC amplifier stage 21 includes first and second differentially coupled NPN transistors 46 and 48 and an external capacitor 44 which is connected between the base of the first differentially coupled transistor 46 and ground potential. The external capacitor 44 charges to a voltage level determined by the collector potential of transistors 22 and 24 in the input gating stage 19, and the diode 42 prevents the capacitor 44 from discharging into the gating stage 19. The AGC amplifier stage 21 further includes a current source transistor 60 which is connected between bias string resistors 58 and 61. The current source transistor 60 and resistors 58 and 61 establish the reference potential on the second differentially coupled transistor 48 in the AGC amplifier stage 21. The first or IF-AGC output signal is derived from the collector of the second differentially coupled transistor 48 and is coupled through resistor 57 to the IF amplifier 13. The IF amplifier 13 may, for example, be of the type disclosed and claimed in copending application Ser. No. 701,368 of Walter R. Davis and James E. Soloman.

The collector of the second differentially coupled transistor 48 is also connected to the base of a first differentially coupled transistor 62 in the RF amplifier and delay stage 23. Transistors 62 and 64 are differentially coupled as shown to a current source transistor 70, and the base of transistor 64 is connected to a reference potential which is higher than the reference potential at the base of transistor 48 in the proceeding differential amplifier stage 21. Therefore, the differentially coupled transistor 62 only responds to voltage variations above a predetermined level and thereby provides a 'delayed' AGC signal at the collector of transistor 62. The differentially coupled transistors 62 and 64 are connected to output circuitry including first and second emitter-followers 80 and 90 and a lateral PNP transistor 84. This output circuitry sets the DC level of the delayed output AGC signal at output terminal 91. The output terminal 91 is connected to an input of the RF amplifier 10 to provide delayed gain control therefor.

The various resistors in the AGC circuit of FIG. 2 which are not specifically identified above are selected to provide desired DC levels in the AGC circuit. The values of these transistors given in the table below were used in a circuit of the type described which has been built and successfully operated. The remaining description of the present invention will be made with reference to the operation thereof in response to applied video sync and gating pulses at input terminals 34 and 36, respectively, of the gating stage 19.

OPERATION

In the absence of gating and sync pulses applied respectively to input terminals 36 and 34 of the gating stage 19, the reference potential at the base of the reference transistor 22 is lower than the DC potential at the base of gating transistor 24; thus, transistor 24 is conducting and reference transistor 22 is nonconducting. With the gating transistor 24 conducting, any video information applied to the base of the input transistor 20 has no affect on transistor 20 and cannot override the potential at the base of gating transistor 24. Therefore, input transistor 20 remains nonconductive.

During the presence of a periodic positive-going video sync pulse 33 in the detected video signal, a negative going gating pulse 35 is applied to the base of the gating transistor 24. The gating pulse 35 turns off transistor 24, and now the reference potential at the base of the reference transistor 22 establishes the switching threshold level for the input transistor 20. That is, the input transistor 20 is differentially switched against the reference transistor 22 as the video sync pulse 33 increases and decreases below the reference potential applied to the base of the reference transistor 22.

Assume that the DC level of the video sync pulse tips applied to the input transistor 20 rises above a desired value and that, in accordance with the AGC action of the present invention, this DC level is to be reduced to that desired value. When the positive going video sync pulse 33 at the base of input transistor 20 rises above the reference potential at the base of reference transistor 22 and during the presence of a negative-going gating pulse 35 to drive the gating transistor 24 to nonconduction, the input transistor 20 is biased into conduction. The reference transistor 22 will turn off when the sync pulse 33 exceeds the reference potential at the base of the reference transistor 22. When transistor 22 turns off, the potential at the common collector node 29 of transistors 22 and 24 rises and charges external capacitor 44 in the AGC amplifier stage 21. When the charge on capacitor 44 and the base potential of the transistor 46 is increased to a potential equal to the potential on the base of transistor 48, transistor 46 will override the reference potential at the base of transistor 48 and conduct. This switching action causes the collector potential of transistor 48 and the AGC voltage at the output terminal 59 to increase. This voltage variation is applied to the IF amplifier 13 and there serves to reduce the DC level of the IF video signal. If the level of video sync pulse tips increases, then the peak current during the gating of transistor 20 will increase and the peak current during the gating of transistor 22 will decrease. This means that the average voltage across capacitor 44 will increase and thereby cause an increase in the average output voltage across output capacitor 63. By this AGC action, the conduction in input transistor 20 is reduced as the sync pulse 33 is AGCed back to a selected DC level.

As long as the average voltage of the positive-going sync pulse 33 applied to the base of input transistor 20 stays within a given range of the DC reference potential on the base of transistor 22, there is no delayed AGC action. For this condition, the output voltage at the RF-AGC output terminal 91 is constant and has no affect on the DC level of the signal through RF amplifier 10. However, when the peak voltage of the positive-going sync pulse 33 exceeds this range and reaches a level which further increases the average voltage on the collector of transistor 48, then the RF-AGC amplifier and delay circuit 23 will provide a delayed RF-AGC signal at the output terminal 91. That is, when the collector voltage of NPN transistor 48 overrides the reference potential at the base of transistor 64, then transistor 62 will conduct to reduce the collector voltage of transistor 62. This negative going voltage variation will tend to reduce conduction in the first emitter-follower transistor 80. As the conduction in transistor 80 is reduced, the lateral PNP transistor 84 tends to turn on harder and, by this action, the base potential at the second emitter follower output transistor 90 is increased. This produces a rise in potential at the RF-AGC output terminal 93 which is coupled into the RF amplifier 10 (FIG. 1) to reduce the DC level of the video sync pulse amplified by the RF amplifier 10.

The current flowing in the lateral PNP transistor 84 establishes the base potential of the second or output emitter-follower 90 in accordance with the value of resistors 86 and 92. The first emitter-follower NPN transistor 80 provides a desired level of base current for the lateral PNP transistor 84; in the absence of emitter-follower transistor 80, the collector current of transistor 62 would normally be too low to provide the desired base drive for the lateral PNP transistor 84. Typically, about 0.5 milliamperes flows in collector resistors 76 and 78 during the conduction of transistors 62 and 64. Since the gain of the lateral PNP transistor 84 varies widely and may have a gain in the order of 1, the emitter-follower transistor 90 would tend to rob collector current from transistor 62 in the absence of the current gain provided by the first emitter follower transistor 80. Thus, the first emitter-follower transistor 80 prevents loading of the collector of the first emitter coupled transistor 62 in the RF-AGC and delay circuit 23.

Listed in the table below are values of resistors, capacitors, and the supply voltage used in a circuit of the type shown in FIG. 2 of the drawing.

TABLE

| Resistor | Value |
|---|---|
| 30 | 300 ohms |
| 38 | 16,000 ohms |
| 40 | 7,500 ohms |
| 32 | 8,000 ohms |
| 50 and 52 | 100 ohms each |
| 56 | 10,000 ohms |
| 54 | 3,600 ohms |
| 58 | 7,500 ohms |
| 57 | 4,000 ohms |
| 76 and 78 | 6,200 ohms each |
| 66 and 68 | 100 ohms each |
| 61 | 300 ohms |
| 72 | 600 ohms |
| 82 | 16,000 ohms |
| 92 | 15,000 ohms |
| 86 | 2,000 ohms |
| 94 | 10,900 ohms |
| 96 | 300 ohms |
| Capacitors | |
| 44 | 2 microfarads |
| 63 | 10 microfarads |
| $V_{cc}$ | 12 volts |

The resistance values given in the table above are those of diffused resistors in a monolithic integrated circuit which has been successfully built and operated. However, the present invention is not limited to monolithic integrated circuits and may include, for example, discrete circuitry connected in the manner described above.

Figure 3:
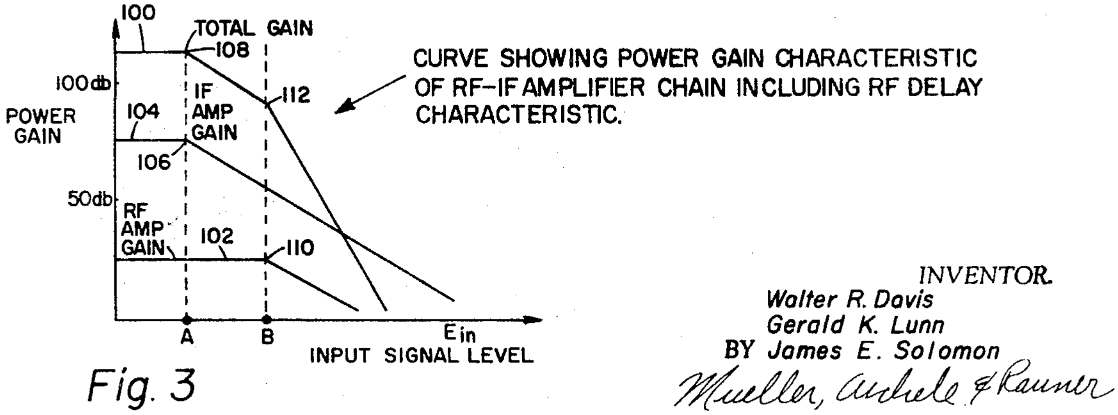
FIG. 3 is a graph of power gain versus signal strength at the input to the RF amplifier in FIG. 1.

Referring now to FIG. 3, the RF-IF AGC action of this invention will be further understood by examining the graph of power gain-versus-signal strength at the input to the RF amplifier 10. The total gain of the television receiver system in FIG. 1 is illustrated by the total gain characteristic 100 which is equal to the sum of the magnitude of the RF amplifier gain characteristic 102 plus the magnitude of the IF amplifier gain characteristic 104. The gain of the RF and IF amplifiers 10 and 13 are both constant for a signal strength less than the level at point A. At point A in FIG. 3, the IF-AGC action becomes effective at break point 106 to reduce the total gain of the receiver. This decrease in total gain is indicated by the portion of the total gain characteristic extending from break points 108 and 112. As the signal strength at the input to the RF amplifier 10 continues to increase above the level at point B, the RF-AGC action becomes effective at break point 110 to sharply reduce the total gain of the amplifier at break point 112 on the total gain characteristic 100. Thus, as the signal strength at the input to the RF amplifier 10 increases beyond point B on the abscissa of the graph shown in FIG. 3, the overall gain of the amplifier begins to sharply decrease. Thus, the AGC circuit 18 according to the present invention delays the gain reduction of the RF amplifier 10 until the gain of the IF amplifier 13 has been substantially reduced.

It should be understood that the present invention may be practiced other than as specifically described above. For example, a negative video signal may be used; in which case it is applied to the base of former reference transistor 22.

When a negative video signal is used, the DC reference potential is applied to the base of the former input transistor 20, and the whole of the video input signal must be positive with respect to the DC reference potential applied to the base of transistor 20 in order for transistor 22 to conduct. The action of transistors 20, 22 and 24 is now similar to the positive-going case described above. Transistor 20 is nonconducting and transistor 22 is conducting during the gating period unless the peak of the negative-going video sync pulse supplied to the base of transistor 22 exceeds in a negative direction the reference potential applied to the base of transistor 20. The current conducted by transistor 22 will be reduced by an amount proportional to the amount that the negative going sync pulse exceeds the negative reference potential applied to the base of transistor 20. Thus, the voltage at the common collector node 29 and the voltage across capacitor 44 will rise as before when the positive-going video sync pulse is larger than a desired level.

There are many changes in the specific circuit connections shown and changes in circuit resistance which can be made so that the output signals of the various stages may be taken from the collector of either one of the differentially coupled transistors in each stage. Therefore, the invention is intended to include within its scope the output connections from the collectors of either of the differentially coupled transistors in each stage and the input connections into the differentially coupled transistors of the next succeeding stage.

Another obvious modification within the scope of the present invention involves changing the specific connection of the lateral PNP transistor 84. It is convenient to use the lateral PNP connection shown in FIG. 2 since the use of the lateral PNP transistor 84 eliminates processing steps when compared with the integrated circuit fabrication of a conventional diffused PNP transistor. However, other means of establishing the desired DC level in the RF-AGC amplifier and delay stage 23 may be substituted for the level-shifting string including resistors 86 and 92 and lateral PNP transistor 84 within the scope of the present invention. Accordingly, said invention is limited only by way of the following appended claims.

We claim:

1. An automatic gain control circuit for a television receiver responsive to composite video signals including at least video sync pulses, the magnitude of which are subject to variation and further including means responsive to the sync pulses for producing gating pulses, the automatic gain control circuit including in combination:

a reference transistor connected to a reference voltage terminal;

a gating transistor differentially coupled to said reference transistor and adapted to receive said gating pulses for biasing said gating transistor to nonconduction and enabling said reference transistor to conduct;

an input transistor differentially coupled to both said gating transistor and said reference transistor and adapted to receive said video sync pulses at the input thereof, said sync pulses operative to bias said input transistor to conduction when said video sync pulses override the reference potential on the reference voltage terminal at a time when gating pulses bias said gating transistor to nonconduction;

means connected to an output electrode of at least one of said reference or input transistors for providing an output signal proportional to the signal level of said sync pulses; and means coupling said output signal to an amplifier for controlling the gain of the amplifier.

2. The automatic gain control circuit defined in claim 1 wherein said coupling means includes a delay stage having first and second differentially coupled transistors therein, said second transistor in said delay stage connected to a point of reference potential and said first transistor in said delay stage coupled to receive the output signal and conductively controlled thereby, one of said first and second transistors in said delay stage providing a delayed automatic gain control signal for controlling the gain of an amplifier.

3. The automatic gain control circuit defined in claim 2 wherein said delay stage further includes:

a. a first emitter-follower buffer transistor coupled to the output of one of said first and second transistors in said delay stage for providing a desired level of output current, b. a lateral PNP transistor coupled to said first emitter follower buffer transistor for establishing a desired DC output voltage level for said delay stage, and c. a second emitter follower buffer transistor DC coupled to said lateral PNP transistor for providing a delayed automatic gain control output signal for controlling the gain of an amplifier.

4. The automatic gain control circuit defined in claim 1 wherein said coupling means includes an AGC amplifier stage including first and second differentially coupled transistors therein, said second differentially coupled transistor in said AGC amplifier stage connected to point of reference potential and said first transistor in said AGC amplifier stage connected to receive said output signal and be conductively controlled thereby, one of said first and second transistors in said AGC amplifier stage providing a control output signal which is adapted to be coupled to an amplifier to control the gain thereof.

5. The automatic gain control circuit defined in claim 4 wherein said coupling means further includes a delay stage coupled to the output of said AGC amplifier stage and responsive to the control output signal thereof to provide a delayed automatic gain control signal, said delay stage responsive to predetermined, greater variations in the signal level of said sync pulse than said AGC amplifier stage to thereby provide a gain control signal which combines with the control output signal from said AGC amplifier to reduce the overall gain of the receiver with which said AGC circuit is used.

6. The automatic gain control circuit defined in claim 5 wherein said delay stage further includes:

a. first and second differentially coupled transistors, said second differentially coupled transistor in said delay stage connected to a point of reference potential and said first differentially coupled transistor in said delay stage connected to receive an output signal from said AGC amplifier stage, and b. means for deriving a delayed automatic gain control signal from the output of one of said first and second differentially coupled transistors in said delay stage.

7. The automatic gain control circuit defined in claim 6, wherein said means for deriving a delayed automatic gain control signal includes:

a. a first emitter-follower transistor connected to one of said first and second differentially coupled transistors in said delay stage for providing a desired current level in the output of said delay stage, b. a lateral PNP transistor connected to the output of said first emitter-follower transistor for establishing the DC level in the output of said delay stage, and c. a second, output emitter-follower transistor DC coupled to said lateral PNP transistor for providing a delayed automatic gain control signal at the output thereof.